US010031277B2

(12) United States Patent
Birman et al.

(10) Patent No.: US 10,031,277 B2
(45) Date of Patent: Jul. 24, 2018

(54) LIGHT GUIDE ASSEMBLY

(71) Applicant: Continental Automotive Systems, Inc., Auburn Hills, MI (US)

(72) Inventors: Vyacheslav B Birman, Auburn Hills, MI (US); Curt Ollila, Fenton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 168 days.

(21) Appl. No.: 15/009,120

(22) Filed: Jan. 28, 2016

(65) Prior Publication Data

US 2017/0153374 A1 Jun. 1, 2017

Related U.S. Application Data

(60) Provisional application No. 62/260,989, filed on Nov. 30, 2015.

(51) Int. Cl.
*G01D 11/28* (2006.01)
*F21V 8/00* (2006.01)
*G01D 13/04* (2006.01)

(52) U.S. Cl.
CPC .............. *G02B 6/008* (2013.01); *G01D 13/04* (2013.01); *G02B 6/0068* (2013.01); *G02B 6/0073* (2013.01); *G02B 6/0083* (2013.01)

(58) Field of Classification Search
CPC ................................ G01D 11/28; G02B 6/008
USPC .......................... 362/23.09–23.13, 23.16–23.2
See application file for complete search history.

(56) References Cited

U.S. PATENT DOCUMENTS

| 6,474,859 | B2 * | 11/2002 | Lepley | G02B 6/0001 |
| | | | | 362/23.01 |
| 6,499,852 | B1 * | 12/2002 | Kino | B60K 37/02 |
| | | | | 362/23.1 |
| 6,874,921 | B2 * | 4/2005 | Verlage | E05B 17/10 |
| | | | | 362/23.15 |
| 7,178,479 | B1 * | 2/2007 | Richter | G01D 7/005 |
| | | | | 116/286 |
| 7,654,679 | B2 * | 2/2010 | Mezouari | G02B 6/001 |
| | | | | 362/23.01 |

(Continued)

FOREIGN PATENT DOCUMENTS

JP 2015137935 A 7/2015

OTHER PUBLICATIONS

International Search Report and Written Opinion dated Mar. 1, 2017 from corresponding International Patent Application No. PCT/US2016/063298.

*Primary Examiner* — Julie Bannan

(57) ABSTRACT

An assembly includes a light guide having a proximal end and a distal end. The proximal end has a light-emitting diode package coupled thereto. The assembly may include another light guide, also having a proximal end and a distal end, with a light-emitting diode package coupled to the proximal end. A light housing may be included that defines a cavity therein, wherein at least a portion of the first and second light guides including the distal ends are disposed in the cavity. Further, a dial face may be included that is disposed adjacent to the first and second light guides and the light housing, wherein each of the first and second light guides are configured to illuminate the dial face. In some variations, flexible printed circuit boards are attached to and electrically connected with the light-emitting diode packages.

5 Claims, 4 Drawing Sheets

(56) References Cited

U.S. PATENT DOCUMENTS

| | | | | |
|---|---|---|---|---|
| 7,677,744 | B2 * | 3/2010 | Birman | B60K 37/02 |
| | | | | 362/23.11 |
| 7,712,907 | B2 * | 5/2010 | Zyka | G02B 5/045 |
| | | | | 362/16 |
| 7,726,862 | B2 * | 6/2010 | Lin | G02B 6/0011 |
| | | | | 362/23.15 |
| 7,845,808 | B2 * | 12/2010 | Lai | G02B 6/001 |
| | | | | 362/23.08 |
| 8,840,260 | B2 * | 9/2014 | Nirei | G01D 11/28 |
| | | | | 362/23.07 |
| 2006/0209525 | A1 | 9/2006 | Birman et al. | |
| 2008/0285256 | A1 | 11/2008 | Mezouari et al. | |
| 2013/0215593 | A1 * | 8/2013 | Kurahashi | G08C 23/06 |
| | | | | 362/23.14 |
| 2014/0165901 | A1 * | 6/2014 | Birman | H03B 28/00 |
| | | | | 116/62.1 |
| 2015/0185388 | A1 * | 7/2015 | Hayden | B60K 37/02 |
| | | | | 362/23.09 |

* cited by examiner

LIGHT GUIDE ASSEMBLY

CROSS-REFERENCE TO RELATED APPLICATIONS

This application claims priority to U.S. Provisional Patent Application No. 62/260,989, filed on Nov. 30, 2015, the contents of which are hereby incorporated by reference into this specification in their entirety.

FIELD

This invention generally relates to illuminated gauge dials. More particularly, this invention relates to a light guide assembly for illuminating a portion of a gauge dial.

BACKGROUND OF THE INVENTION

Instrument panels, such as those utilized for automotive applications, utilize illuminated gauges and pointers to improve gauge readability and provide a desirable aesthetic appearance. In some cases, an illuminated ring is provided surrounding an instrument cluster. A plurality of light-emitting diodes (LEDs) may be placed about the circumference of the gauge to illuminate the ring. Numerous LEDs may be placed close together along the ring in order to provide uniform illumination of the ring.

Disadvantageously, numerous LEDs and associated electronics add expense and packaging challenges. Accordingly, it is desirable to design and develop a device for uniformly illuminating a ring without adding expense and with feasible packaging.

SUMMARY

This present disclosure provides one or more light guide assemblies for illuminating a ring or strip of material, which may be disposed around an instrument cluster. Therefore, the strip of material may be substantially uniformly illuminated with fewer LEDs required.

In one variation, which may be combined with or separate from the other variations described herein, a light guide assembly is provided that includes a light-emitting diode package configured to emit light rays therefrom. The light guide assembly includes a flexible printed circuit board. The light-emitting diode package is attached to and electrically connected with the flexible printed circuit board. A light guide is included, which is configured to conduct the light rays therethrough. The light-emitting diode package and the flexible printed circuit board are coupled to the light guide.

In another variation, which may be combined with or separate from the other variations described herein, a dial face assembly is provided that includes a first light guide having a proximal end and a distal end. The proximal end of the first light guide has a first light-emitting diode package coupled thereto. The dial face assembly also has a second light guide having a proximal end and a distal end. The proximal end of the second light guide has a second light-emitting diode package coupled thereto. A light housing defines a cavity therein. At least a portion of each of the first and second light guides including the distal ends are disposed in the cavity. A dial face is disposed adjacent to the first and second light guides and the light housing. Each of the first and second light guides is configured to illuminate the dial face.

In yet another variation, which may be combined with or separate from the other variations described herein, a dial face assembly is provided that includes a first light guide assembly including a first flexible printed circuit board, a first light-emitting diode package configured to emit light rays therefrom, and a first light guide. The first light-emitting diode package is attached to and electrically connected with the first flexible printed circuit board. The first light guide has a proximal end and a distal end. The first light guide is configured to conduct the light rays of the first light-emitting diode package. The first light-emitting diode package and the first flexible printed circuit board are coupled to the first light guide. A second light guide assembly includes a second flexible printed circuit board, a second light-emitting diode package configured to emit light rays therefrom, and a second light guide. The second light-emitting diode package is attached to and electrically connected with the second flexible printed circuit board. The second light guide has a proximal end and a distal end. The second light guide is configured to conduct the light rays of the second light-emitting diode package. The second light-emitting diode package and the second flexible printed circuit board are coupled to the second light guide. A light housing defines a cavity therein. At least a portion of each of the first and second light guides including the distal ends are disposed in the cavity. A dial face is disposed adjacent to at least a portion of the first and second light guides and the light housing. Each of the first and second light guides is configured to illuminate the dial face. The proximal ends of the first and second light guides extend from the light housing. The first and second light-emitting diode packages are located outside of the light housing.

These and other features of the present disclosure can be best understood from the following specification and drawings, the following of which is a brief description.

DETAILED DESCRIPTION

Figure 1:
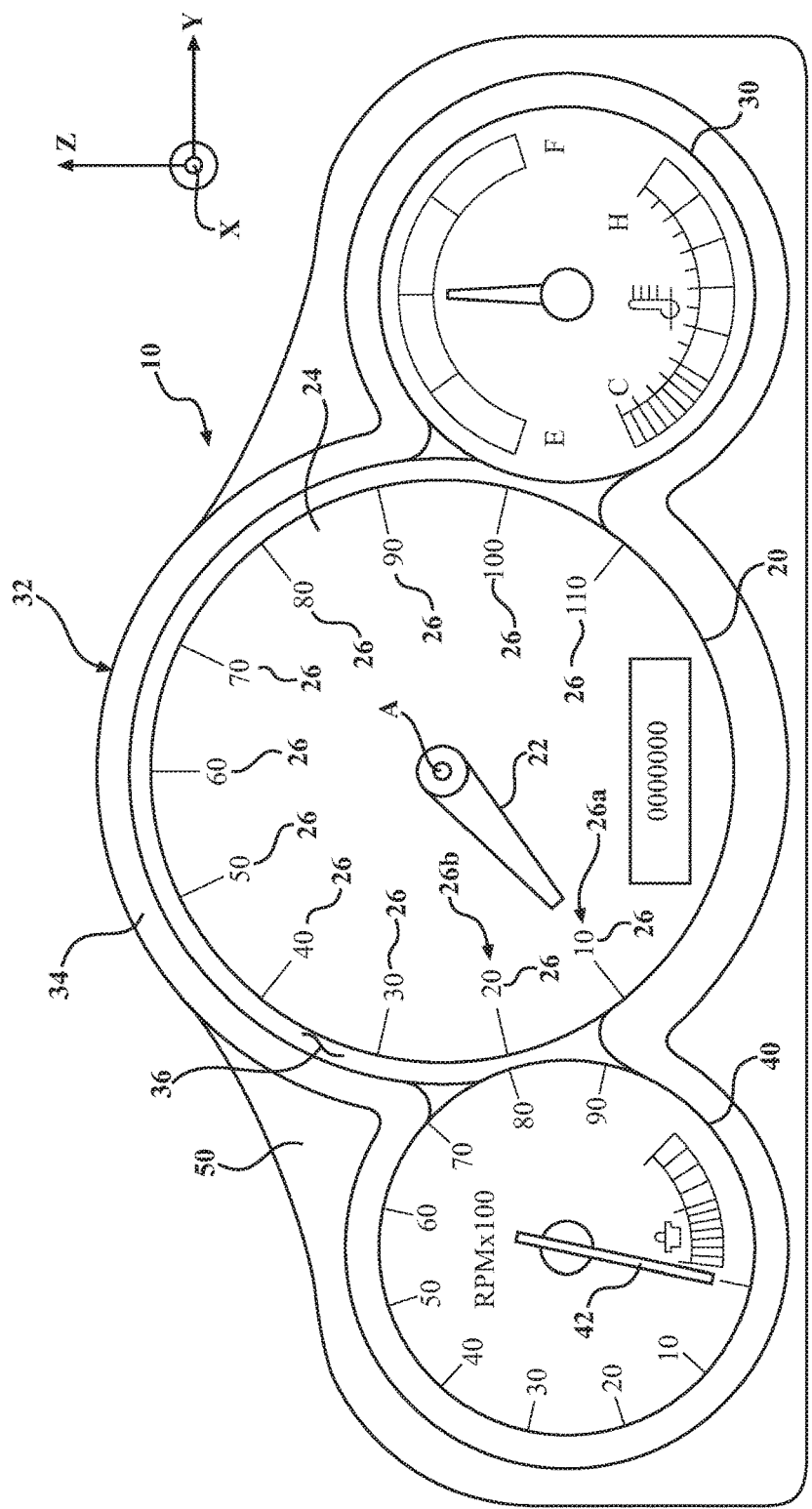
FIG. 1 is a schematic front view of an example vehicle dashboard and instrument panel including an instrument cluster assembly having a dial face assembly, in accordance with the principles of the present disclosure.

Referring to the FIG. 1, a vehicle dashboard 10 includes an instrument panel 50 including a main instrument cluster assembly 20 and several secondary gauges 30, 40. The main instrument cluster assembly 20 includes a pointer 22 that rotates about an axis A extending through a dial 24 to indicate a specific operating parameter. Information given by the instrument cluster assembly 20 may include, by way of example, tachometer information, vehicle speed information, fuel level information, engine temperature, or any other information that is desired to communicate to the driver of the vehicle. Several indicia 26, such as speed values, are located on the dial 24. The indicia 26 are disposed in a circular pattern about the axis of rotation A, in this example.

The pointer 22 is configured to rotate with respect to the dial 24, about the axis A. For example, the pointer 22 may be mounted to a shaft that is driven by a stepper motor (not shown). The stepper motor may be mounted to a printed circuit board (not shown). The dial 24 may be opaque, transparent, or translucent.

A dial face assembly is illustrated and generally designated at 32. In this example, the dial face assembly 32 refers to the illuminatable strip of material that surrounds the instrument clusters 20, 30, 40. In this example, the dial face assembly 32 surrounds all three of the instrument clusters 20, 30, 40; however, it should be understood that the dial face assembly 32 could surround merely one of the instrument clusters 20, 30, 40, or any other desired component.

The dial face assembly 32 includes a dial face assembly cover 34. The dial face assembly 32 may have any desired shape, including having a non-linear shape, even in three dimensions. For example, the dial face assembly 32 may have a non-linear curved shape, that may be curved in the x-plane, y-plane, and/or z-plane (axes x, y, and z shown in FIG. 1). The dial face assembly 32 may be designed to generally form a ring or closed strip of material defining an aperture 36 therethrough. For example, the dial face assembly 32 is a complex ring shape, which is not merely circular or elliptical, but that is formed as a continuous ring running along the outer exposed edges of the three gauges 20, 30, 40, such as the edge of three merged circles. Thus, the dial face assembly 32 is disposed about a perimeter of the three gauges 20, 30, 40, in this example. The dial face 32 is disposed around the instrument cluster assembly 10, the instrument clusters 20, 30, 40 being viewable through an aperture 36 defined by the dial face assembly 32 and the dial face assembly cover 34.

Figure 2:
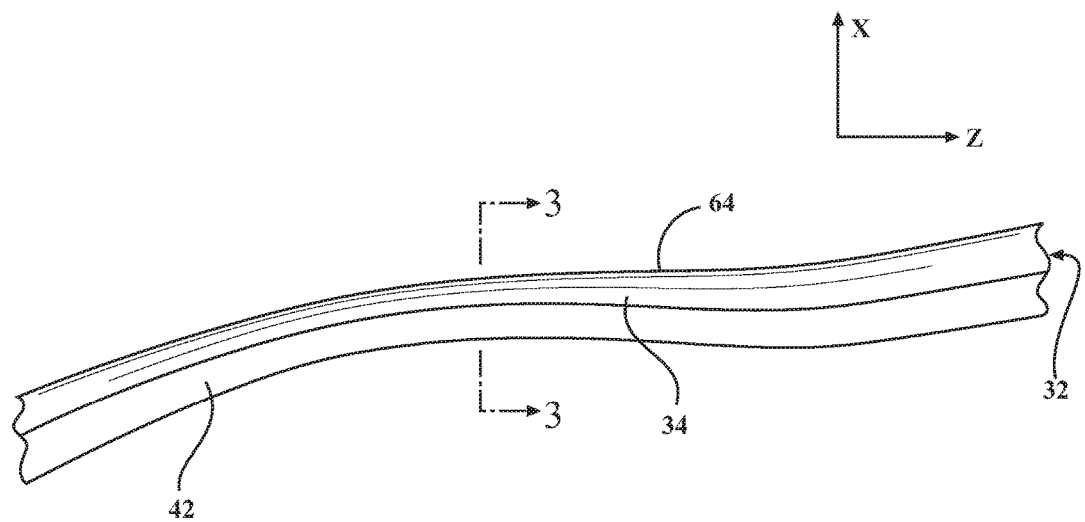
FIG. 2 is a perspective view of a portion of the dial face assembly of FIG. 1, according to the principles of the present disclosure.
Figure 3:
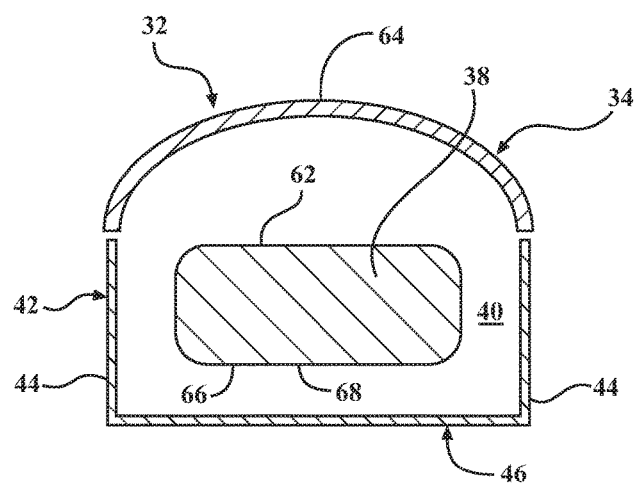
FIG. 3 is a schematic cross-sectional view of the dial face assembly of FIGS. 1-2, taken along the line 3-3 in FIG. 2, in accordance with the principles of the present disclosure.

Referring now to FIGS. 2 and 3, additional details of the dial face assembly 32 are shown and described. The dial face assembly 32 is also curved in the x-direction, as shown in FIG. 2, in addition to being curved in the y- and z-directions, as shown in FIG. 1. The dial face assembly 32 comprises at least one light guide 38 that is configured to direct, conduct, and/or propagate light rays therethrough. The light guide 38 is disposed within a cavity 40 defined by a light housing 42. The light housing 42 may be opaque to prevent light leakage from the sides 44 and bottom 46 of the light housing 42. The dial face assembly cover 34 is disposed over the light guide 38, the dial face assembly cover 34 being disposed adjacent to the light guide 38 and the light housing 42. The light guide 38 is at least partially disposed between the light housing 42 and the dial face assembly cover 34. In this example, the dial face assembly cover 34 comprises a strip of material defining the aperture 36.

The light guide 38 and the dial face assembly cover 34 each have a non-linear shape in the x-, y-, and/or z-planes. In some variations, the shape of the light guide 38 corresponds to the shape of the dial face assembly cover 34. The light guide 38 and/or the dial face assembly cover 34 may have a curved shape, curved in the x-, y-, and/or z-planes, similar to that of the dial face assembly 32 as a whole, described above.

Figure 4:
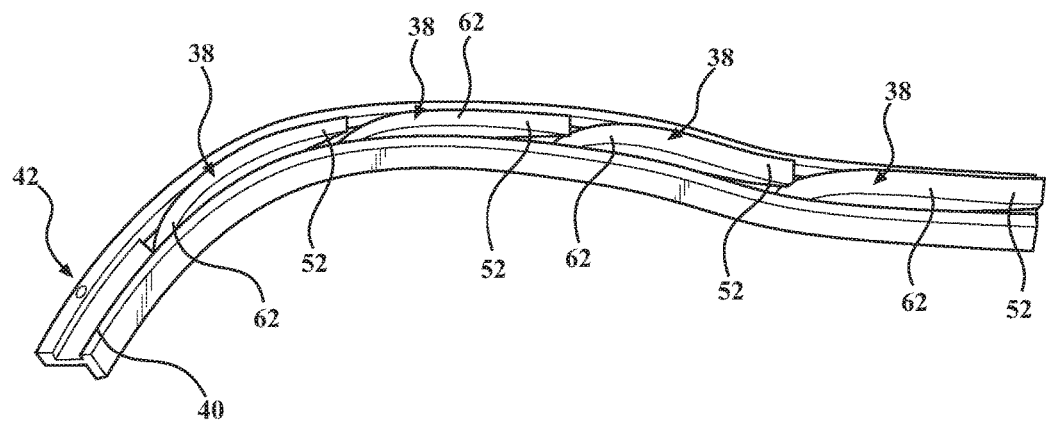
FIG. 4 is a top perspective view of a portion of the dial face assembly of FIGS. 1-3, having the dial face assembly cover removed to show the components thereunder, according to the principles of the present disclosure.
Figure 5:
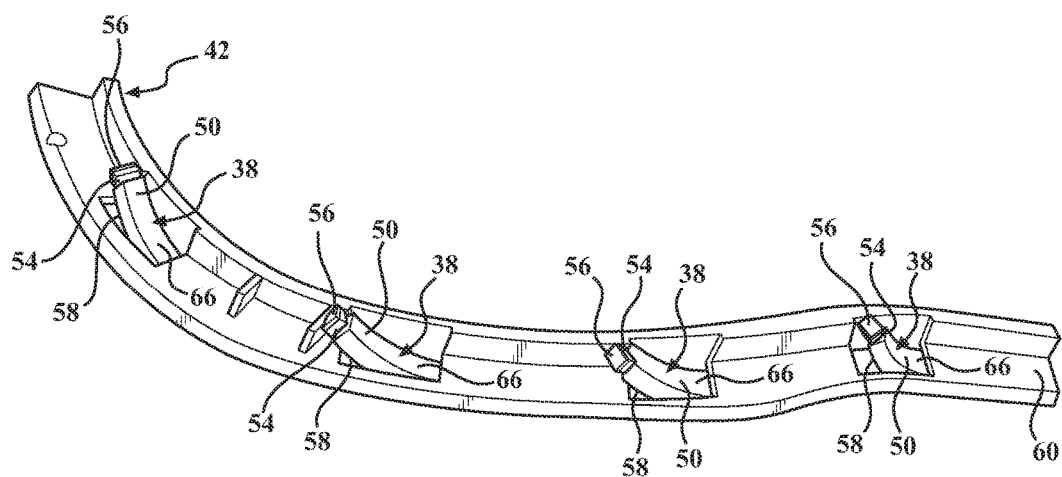
FIG. 5 is a bottom perspective view of the portion of the dial face assembly shown in FIG. 4, having the dial face removed, in accordance with the principles of the present disclosure.
Figure 6:
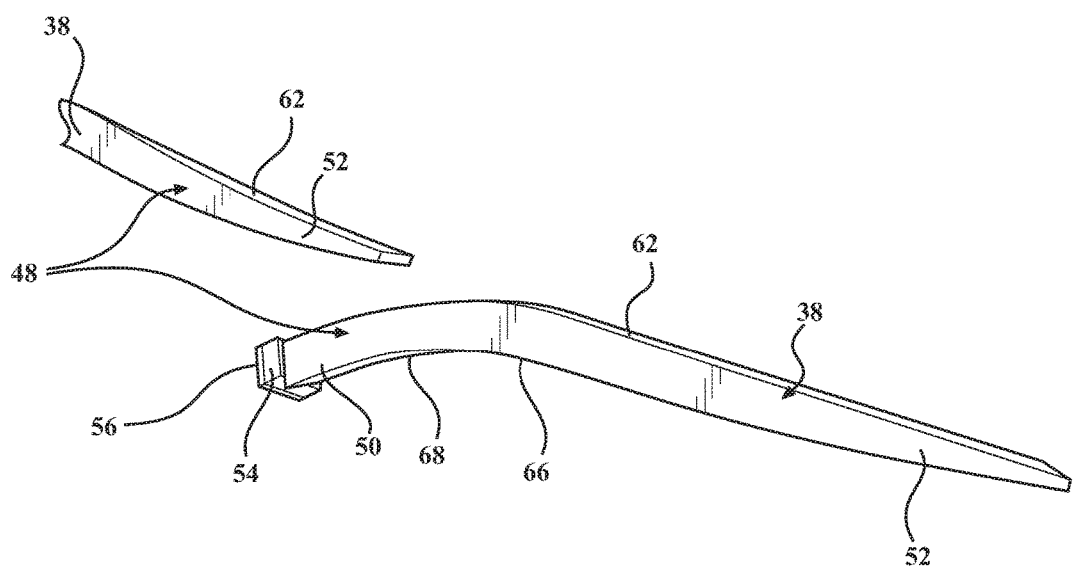
FIG. 6 is a perspective view of a plurality of light guide assemblies of the dial face assembly of FIGS. 1-5, according to the principles of the present disclosure.

Referring now to FIGS. 2-6, and especially FIG. 6, the dial face assembly 32 may include a plurality of light guide assemblies 48. Each light guide assembly 48 includes a light guide 38. Each light guide 38 includes a proximal end 50 and a distal end 52. The light guides 38 may be curved along their bodies between the proximal and distal ends 50, 52. Each proximal end 50 has at least one light-emitting diode (LED) package 54 coupled thereto. The LED packages 54 may be red-green-blue (RGB) LED packages that are configured to selectively illuminate in a variety of colors, by way of example. In the alternative, other types of light sources could be used. The LED packages 54 are configured to emit light rays therefrom. The light guides 38 preferably have a large ratio of curvature at the proximal ends 50 for minimizing the loss of light at the proximal ends 50.

The LED packages 54 may each be attached to and electrically connected with a flexible printed circuit board 56. For example, each light guide 38 may have its own dedicated flexible printed circuit board 56 having at least one LED package 54 disposed thereon. At least one LED package 54 and at least one flexible printed circuit board 56 are coupled with the proximal end 50 of each light guide 38. The flexible printed circuit boards 56 may be flexible pieces of foil with conducting lines in the foil for electrically connecting the LED packages 54 disposed thereon or adjacent thereto.

As shown in FIGS. 4-5, the distal ends 52 of the light guides 38 are disposed within the cavity 40 of the light housing 42 and adjacent to the dial face assembly cover 34, while the proximal ends 50 extend from the light housing 42 and are disposed outside of the light housing 52. Therefore, the LED packages 54 and the flexible printed circuit boards 56 are also located outside of the light housing 42, in this example. In other variations, the entirety of the light guides 38 could be included inside of the light housing 42, with perhaps only the flexible circuit boards 56 protruding or extending from the light housing 42 and/or located outside of the light housing 42. In this example, the proximal ends 50 protrude through openings 58 in the bottom surface 46 of the light housing 42.

Thus, the LED packages 54 are powered and controlled through the printed circuit boards 56, and the LED packages 54 are configured to emit light rays that are received by the light guides 38. The light guides 38 are configured to propagate and/or conduct the light rays therethrough and emit at least a portion of the light rays through the front side 62 of the light guides 38. As light rays are emitted from the front sides 62 of the light guides 38, and each front side 62 is disposed adjacent to the dial face assembly cover 34, each light guide 38 is configured to illuminate a portion of the dial face assembly cover 34. The dial face assembly cover 34 is preferably transparent and/or translucent to allow the light from the light guides 38 to be visible from a top surface 64 of the dial face assembly cover 34. Each light guide 38 may be a plastic lens, acrylic (such as PMMA) or formed of any other suitable material to propagate light rays therethrough.

In some variations, a strip of white foil 66 may be stamped or otherwise attached to a back side 68 of each light guide 38. Thus, the white foil 66 and the back side 68 are disposed adjacent to the bottom surface 46 of the light housing 42. The white foil 66 may assist with reflecting light rays toward the front side 62 of the light guide 38 and out of the top surface 64 of the dial face assembly cover 34.

Referring to FIGS. 4-6, each light guide 38 is disposed adjacent lengthwise to another light guide 38 around the perimeter of the dial face assembly 32. In other words, each proximal end 50 is disposed adjacent to a distal end 52 of an adjacent light guide 38. Accordingly, the light guides 38 are disposed head-to-tail along the length of the dial face assembly 32 with the distal ends 52 being disposed serially within the light housing 42. In this way, the light guides 38 each can illuminate an adjacent portion of the dial face assembly cover 34. If desired, the dial face assembly cover 34 can be illuminated by the light guides 38 with substantial uniformity, by fully illuminating each light guide 38. Each light 38 illuminates a corresponding adjacent section of the dial face assembly cover 34 to fully illuminate the dial face assembly cover 34.

It should be understood, that if desired, some of the light guides 38 could be turned off or not illuminated, so as to illuminate only a portion of the dial face assembly cover 34 and leave a portion of the dial face assembly cover 34 not illuminated.

Furthermore, the light guides 38 may simultaneously all be illuminated with the same color; or in the alternative, one light guide 38 or lights guides 38 could be illuminated in a first color, while another light guide 38 or light guides 38 could be illuminated in a second, different color. For example, a first light guide 38 could be illuminated in red, while a second light guide 38 could be illuminated in blue. Therefore, corresponding sections of the dial face assembly cover 34 would be illuminated in the same color as the light guide 38 that lies under that section of the dial face assembly cover 34.

In some variations, a first light guide 38 could be configured to be selectively illuminated in a plurality of first colors, wherein each first color is selected based on a first operating parameter of a motor vehicle. Another light guide 38 could be configured to be selectively illuminated in a plurality of second colors, wherein each second color is selected based on a second operating parameter of the motor vehicle. The light guides 38 then illuminate corresponding sections of the dial face assembly cover 34 according to the colors which the light guides 38 have been illuminated.

More particularly, a first light guide 38, or a section of adjacent light guides 38, could be illuminated in red, green, or yellow, according to a vehicle operating parameter, such as speed. In one example, the light guides 38 along a top half of the dashboard 10 could be illuminated according to the speed. Another light guide 38 or section of light guides 38, such as the light guides 38 disposed along the bottom of the dashboard 10 could be illuminated in various colors, such as red, green, or yellow, based on a vehicle condition, such as tire pressure. For example, if the tire pressure is very low, the bottom section of the dial assembly 32 could be illuminated by some of the light guides 38 in red; if the tire pressure is marginally low, the same light guides 38 could illuminate the bottom section of the dial assembly 32 in yellow, and if there is no problem with tire pressure, the same light guides 38 could illuminate the bottom section of the dial assembly 32 in green. This is just one example of various colors and ways that the light guides 38 could illuminate the dial face assembly cover 34 according to a vehicle condition or a vehicle parameter.

It should be understood that any of the above described concepts can be used alone or in combination with any or all of the other above described concepts. As a person skilled in the art will readily appreciate, the above description is meant as one illustration of the principles of the invention. This description is not intended to limit the scope or application of the invention in that the invention is susceptible to modification, variation, and change, without departing from the spirit and scope of the invention, as defined in the following claims.

What is claimed is:

1. A light guide assembly comprising:
a light-emitting diode package configured to emit light rays therefrom;
a light guide configured to conduct the light rays therethrough, the light-emitting diode package being coupled to the light guide, the light guide having a first end and a second end, the first end disposed within a light housing and adjacent to a dial face assembly cover, the second end extending from the light housing, the light-emitting diode package being coupled to the second end of the light guide;
a dial face assembly including the dial face assembly cover and the light housing, the light guide being at least partially disposed between the light housing and the dial face assembly cover, the light guide being configured to illuminate the dial face assembly cover, the light guide and the dial face dial face assembly each having a non-linear shape, the shape of the light guide corresponding to the shape of the dial face assembly; and
wherein the dial face assembly comprises a closed strip of material defining an aperture therethrough and being disposed about the perimeter of an instrument cluster, the instrument cluster being viewable through the aperture defined by the shape of the dial face assembly.

2. The light guide assembly of claim 1, the light guide having a front side and a back side, the light guide assembly further comprising white foil stamped to the back side of the light guide, the front side of the light guide being disposed adjacent to the dial face assembly and the back side of the light guide being disposed adjacent to a surface of the light housing.

3. The light guide assembly of claim 2, the light housing being opaque and defining a cavity, the first end of the light guide being disposed in the cavity.

4. A dial face assembly comprising:
a first light guide having a proximal end and a distal end, the proximal end of the first light guide having a first light-emitting diode package coupled thereto;
a second light guide having a proximal end and a distal end, the proximal end of the second light guide having a second light-emitting diode package coupled thereto;
a light housing defining a cavity therein, at least a portion of the first and second light guides including the distal ends being disposed in the cavity; and
a dial face assembly cover disposed adjacent to the first and second light guides and the light housing, each of the first and second light guides being configured to illuminate the dial face assembly cover, and
wherein the dial face assembly comprises a closed strip of material defining an aperture therethrough and being disposed about the perimeter of an instrument cluster, the instrument cluster being viewable through the aperture defined by the dial face assembly;
wherein the first and second light guides are each curved;
wherein the proximal ends of the first and second light guides extend from the light housing, the first and second light-emitting diode packages being located outside of the light housing;
wherein the dial face is made of a material that is at least one of: transparent and translucent;
wherein, each of the first and second light guides has a front side and a back side, the light guide assembly further comprising a first white foil stamped to the back side of the first light guide and a second white foil stamped to the back side of the second light guide, the front sides of the first and second light guides being disposed adjacent the dial face assembly and the back sides of the first and second light guides being disposed adjacent to a surface of the light housing.

5. The dial face assembly of claim 4, the first light guide being configured to illuminate a first section of the dial face assembly and the second light guide being configured to illuminate a second section of the dial face assembly, the first light guide being configured to selectively illuminate the first section in a plurality of first colors, wherein each first color is selected based on a first operating parameter of a motor vehicle, the second light guide being configured to selectively illuminate the second section in a plurality of second colors, wherein each second color is selected based on a second operating parameter of the motor vehicle.

* * * * *